Nov. 8, 1960 W. LEONCHICK 2,959,715

INSTRUMENT RACK ASSEMBLY

Filed Oct. 24, 1958 2 Sheets-Sheet 1

INVENTOR.
Walter Leonchick
BY
Leonard S. Knox
Atty.

Nov. 8, 1960 W. LEONCHICK 2,959,715

INSTRUMENT RACK ASSEMBLY

Filed Oct. 24, 1958 2 Sheets-Sheet 2

INVENTOR.

Walter Leonchick

BY.

Leonard S. Knox

Atty.

2,959,715
Patented Nov. 8, 1960

2,959,715

INSTRUMENT RACK ASSEMBLY

Walter Leonchick, 6961 Vine St., La Grange, Ill.

Filed Oct. 24, 1958, Ser. No. 769,431
7 Claims. (Cl. 317—99)

This invention relates to a rack assembly for demountably receiving instrument chassis and the like. In one aspect it has reference to a rack within which may be received one or more chassis carrying instruments, electrical or electronic components and the like which are to be isolated against the effect of shock and vibration and, in particular, contemplates an arrangement wherein the chassis may be semi-permanently installed in a manner permitting removal and replacement without disturbing the devices included for shock mounting.

In prior rack assemblies for the foregoing purpose, the shock mounts have been incorporated in such fashion that removal of the chassis for servicing, revision or other reasons has necessitated dismemberment of the shock mounts from either the permanent rack or the chassis proper. Inasmuch as in nearly all cases accessibility is difficult the operation of withdrawing and replacing the chassis was attended with considerable unnecessary expenditure of time and effort.

Accordingly, the principal object of the invention is to provide a rack and chassis assembly characterized by shock mounting of the chassis but wherein the chassis may be expeditiously removed and replaced without disturbing the plurality of shock mounts.

Another object is to provide an arrangement of modular character in order that a minimum height of chassis or similar unitary assembly may be established as a module and the rack made to accommodate other assemblies in multiples thereof whereby the number of different parts required for the rack and individual chassis may be a practical minimum.

A further object is to provide a rack and chassis assembly as aforesaid wherein the metal chassis may be electrically insulated from the rack.

An additional object is to provide a rack for the purpose stated including means for natural circulation of air to conduct heat away from the components which, in most cases, will dispense with power-driven blowers.

Other objects will become apparent from the following description which, taken with the accompanying drawings, discloses a preferred form of carrying the invention into practice.

Regarded in its broad aspect, the invention comprises a two-part housing comprising an outer, rigid, substantially box-like structure open at least at the front and inner floating walls, or panels, for receiving instrument assemblies or chassis. Preferably the outer portion of the housing comprises a pair of vertical side panels suitably spaced apart and rigidly supported by a common base and having a common top. The inner floating walls of the housing are constituted as a pair of opposite side panels provided with a plurality of shock mounts of any acceptable commercial type, there being one such plurality for each shelf. It will be understood from the ensuing description that the rack may be made of such height as to receive one or more shelves or chassis and that the racks may be multiplied as desired not only in a lateral direction but back-to-back. Moreover a modular arrangement is desirable for flexibility in meeting the customer's requirements with a minimum stock of parts. Each shockmount is secured by one of its two principal parts to the side panel and by the other part to an intermediate support member which latter is a permanent part of the housing or, in effect, an inner, secondary portion of the housing. The spacing is such as to accommodate the width of a shelf or shelves carrying electronic components, sensitive instruments or devices and the like which are to be mounted in a manner to minimize damage thereto by vibration and shock. The support members and shelf are provided with means for detachable securement of the shelf to allow removal thereof without the necessity of disturbing the points of attachment of the shockmounts to the secondary portion of the housing. Where a plurality of shelves are carried in a single housing, the support members and their thereto secured shockmounts may be common to a plurality of shelves. In another aspect, the invention includes outer side walls for the housing which are doubly offset in a vertical direction to define a vertically extending trough, the floor of which is perforated or provided with louvers. Thus, when a pair of housing assemblies are abutted laterally, the confronting troughs define a chimney providing natural draft for carrying away the hot air resulting from the operation of heat-producing devices e.g. thermionic vacuum tubes.

Turning now to the drawings there is shown (Fig. 1) an assembly comprising three housings 10 in accordance with invention. It will be understood from what follows that a single housing or any plurality thereof may be employed, each thereof being identical in construction and that, if desired, the same may be placed back-to-back.

Figure 2:
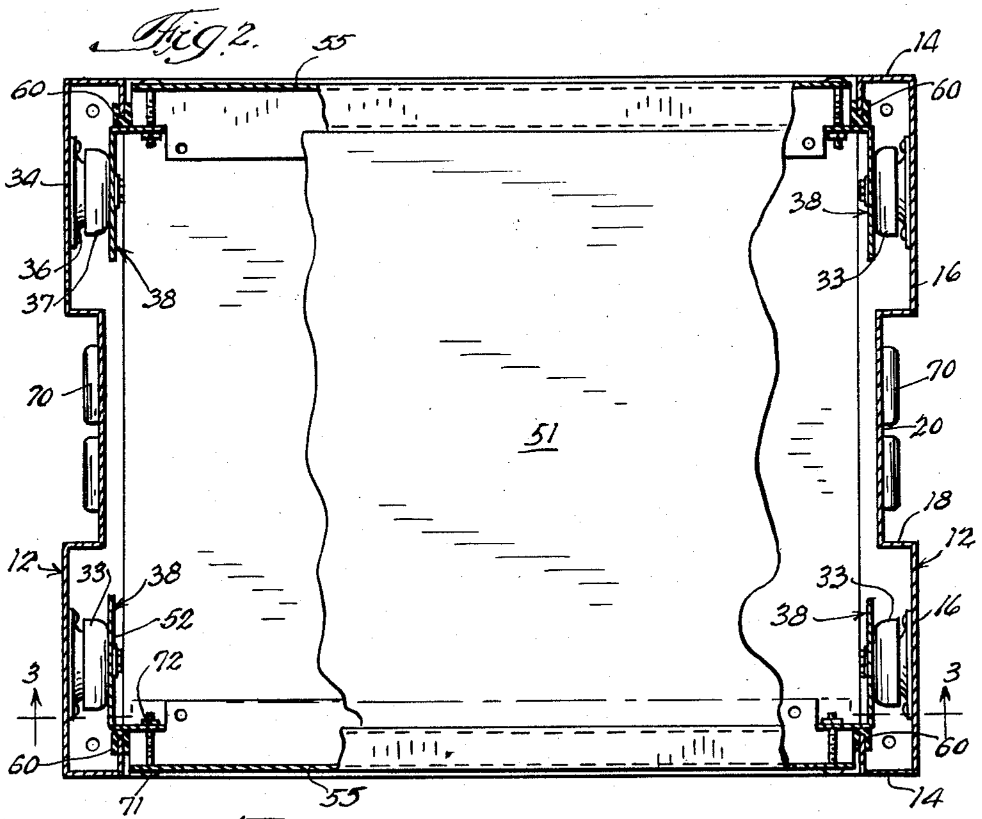
Fig. 2 is a cross section taken on the horizontal plane 2—2 of Fig. 1.
Figure 3:
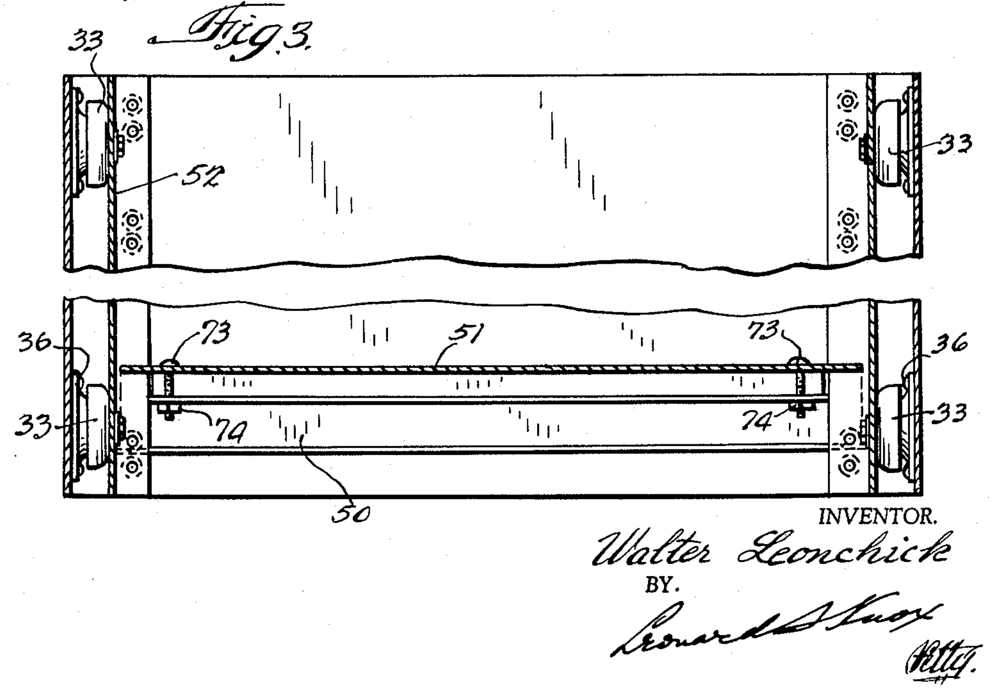
Fig. 3 is a cross section taken on the line 3—3 of Fig. 2.

Each assembly 10 comprises a pair of vertical side panels 12 of sheet metal deformed along vertical lines to provide front and rear U-shaped rigidifying sections 14 (Fig. 2), body sections 16 and a trough section 18, the latter including a floor 20. It will be noted that the depth of the trough section 20 is less than the width of the sections 14 in order to avoid interference with the shelves to be described.

The panels 12 are rigidly supported and spaced by a base 22 and preferably also by a cover 24. In the illustrated example three assemblies 10 are shown and the base and/or cover are accordingly coextensive therewith. Obviously each assembly may have an individual base and cover or, in the case of a common base and/or cover, the same may be conveniently manufactured in modular dimensions.

The base 22 comprises a frame of any convenient cross section, e.g. U-shaped as shown, welded at the corners and provided with welded gussets 25 having apertures 26 to receive foundation bolts (not shown). Each of the panels 12 is provided at its upper and lower margins with angle brackets 28 suitably bored to align with companion holes 29 in the base 22 through which bolts may be secured. Similarly the cover 24 is provided with holes 31. There is thus provided a rigid, box-like structure having an open front and rear. No cover for the rear is shown since the assemblies are capable of being installed back-to-back but it will be apparent that, in the absence of such combining, a simple, flat, rear panel secured to the sections 14 may be provided.

A plurality of shock mounts 33 of any suitable, commercial design are secured to the sections 16. These are desirably arranged in horizontal pairs adjacent the top and bottom edges of the vertical panels. However, depending upon the weight the shock mounts are called upon to carry and the capacity of each mount more or less than four mounts may be utilized at each side. In the example one part of the shock mount is a flanged base 34 secured by bolts or machine screws 36. Assuming (Fig. 2), for purposes of this specification, that the flange is the "fixed" member of the shock mount the "movable" member 37 thereof is secured to an intermediate support member 38 and is preferably of L-shaped transverse cross section, the shorter leg of which constitutes a flange and the longer leg of which receives a screw threaded into the shock mount movable member. Thus each pair of shock mounts, regarded in a vertical sense, supports one of the members 38.

Each pair of front or rear panels 38 serves to support one or more shelves or drawers carrying the instruments or other devices. That is to say, support may be afforded by securing the shelf or drawer slides directly to the support members 38 by utilizing attaching means between either a front or rear pair and the shelf or slide or by attaching means between the respective ones of the front and rear pair of support members and the shelf or drawer slide. Alternatively there may be an intermediate member or strut spanning a pair of front and/or rear panels widthwise.

By way of example, I have shown a plurality of shelves 51 (Fig. 5) of sheet metal having a width substantially equal to the distance between the legs 52 of the opposed support members 38 and a depth substantially equal to the distance between the return legs 14 of the panels 12. It will be obvious that the shelf or shelves 51 may themselves be a chassis or the chassis may be secured thereto.

Figures 1, 4, 5:
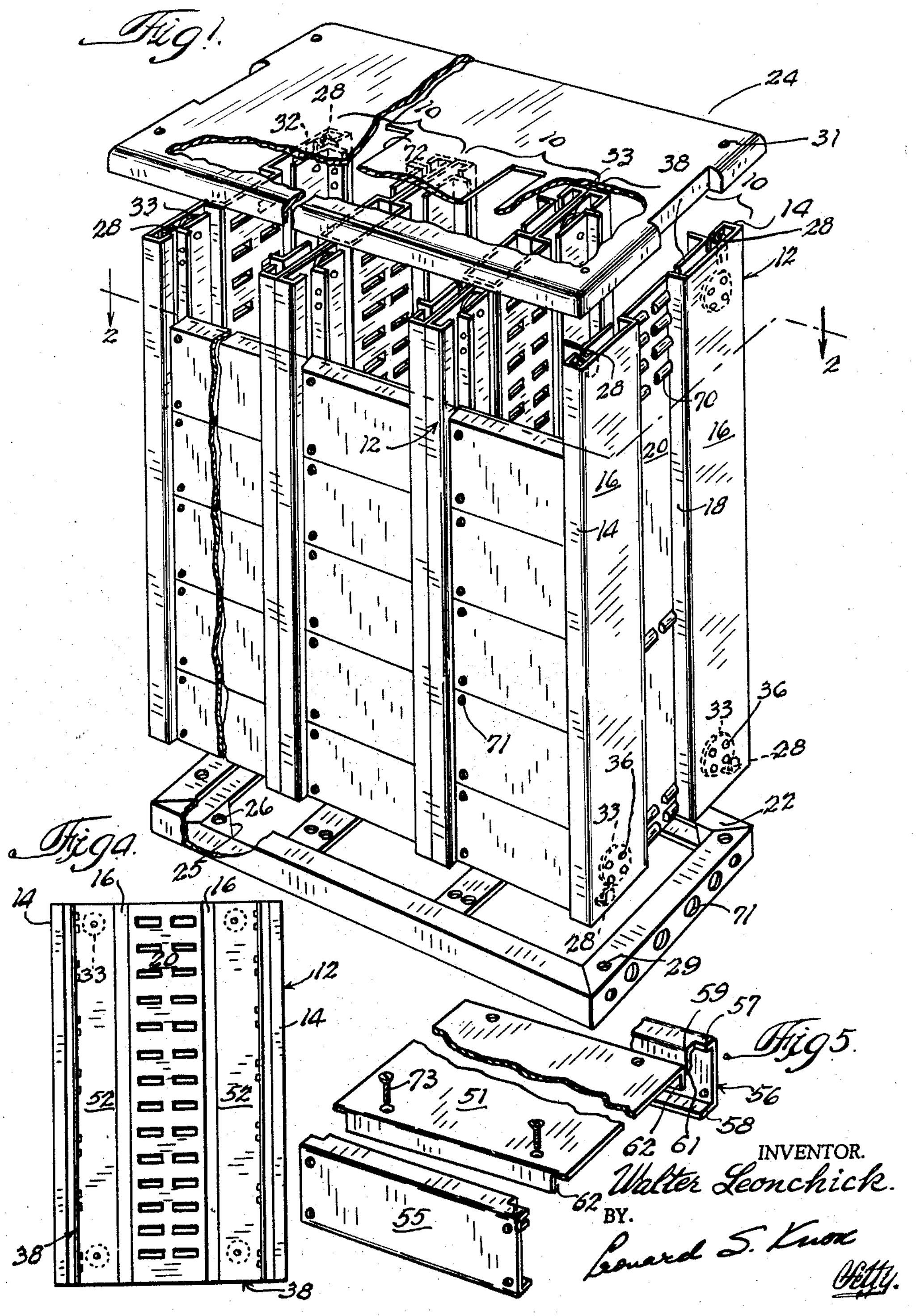
Fig. 1 is an exploded perspective view of a rack assembly carrying electronic equipment or the like embodying the invention.
Fig. 4 is a detail of one of the side panel assemblies.
Fig. 5 is a perspective detail of one of the removable shelves serving as a chassis or for carrying a chassis.

In order to carry the shelf 51 with respect to the members 38, I prefer to provide at least one transverse support or strut 55, having a cross section best seen in Fig. 5, comprising an outwardly facing portion 56 and upper and lower inwardly directed legs 57 and 58, the upper leg 57 being returned vertically downwardly and then horizontally inwardly to form portions 59 and 61. The adjacent margins of the shelf are bent downwardly to form flanges 62 whereby to rigidify the shelf, these resting on the portion 61. Screws 71 threaded into welded nuts 72 secure the supports 55 to the members 38 and screws 73 and similar nuts 74 secure the shelf to the leg 61 of the supports 55. In the case where the shelf 51 and the components carried thereby are sufficiently light in weight it may be found that one support 55 will be adequate although two, one at the front and one at the rear, are preferred.

If it is desired to have the chassis or the shelf carrying the chassis slidably associated with the members 38 a pair of opposite front-to-back slides may be secured to the respective members 38 upon which a shelf or chassis 51 may be slid and, if desired, detachably secured thereto.

To minimize tinkering and for esthetic reasons the members 55 may be made commercially available in some selected modular height or heights in order that the same may be utilized in mutually abutting fashion to cover the front of the housing where a chassis is devoid of front controls or is omitted. (Fig. 1). Obviously one or more of the members 55 may be simply blanks, i.e. unassociated with a shelf or chassis.

To supplement the mechanical isolation of the components carried on the panels 38 it is preferred to apply a channel shaped, elongated, resilient, electrically nonconductive strip 60 (Fig. 2) to the inner edge of the return portions 14 of the panels 12. Thus the members 38 will, under the effects of shock and vibration, be prevented from striking the panels 12. Moreover the strip 60 provides electrical insulation between the possibly "live" chassis and the exposed framework of the housing. In this connection it will be comprehended that the rubber element joining the two parts of the shock mounts provide electrical isolation between the panels 12 and members 38.

The indented portion 20 of the panels 12 is perforated or provided with louvers 70 to dissipate heat. Where two housings are juxtaposed laterally the portions 20 together define a chimney which further facilitates such dissipation by reason of the natural draft therethrough.

One or more holes 71 may be provided in the base 22 for entrance of cool air. Moreover the cover 24 is provided with openings 72 in alignment with the paired trough portions 20, wherever they occur.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. An assembly adapted for mounting instrument chassis and the like comprising: a housing comprising a base and a pair of opposed, vertical, parallel, side panels spaced apart on and secured to said base defining an open front for access to the space between said panels, a vertical, floating, side wall member individual to each panel, parallel thereto, positioned therewithin and spaced therefrom to define corresponding access, a plurality of resilient devices secured permanently between said members and panels providing the sole support for said members isolating the same against transmission of shock and vibration from the panel to its associated member, said side panels, members and devices together constituting permanent components of the housing; an instrument chassis adapted to be removably installed and supported on said members, and means common to said chassis and members detachably and rigidly securing said chassis with respect to said members.

2. An assembly in accordance with claim 1 wherein said chassis comprises a horizontally disposed base including an attaching portion, said detachably securing means comprises a strut extending transversely between said members and secured only thereto, and elements passing through said attaching portion for fastening said chassis to said strut.

3. An assembly in accordance with claim 2 further characterized in that said vertical support members are provided with a vertical, forward, marginal flange returned on the body of the member and said strut is secured to the flange of each member.

4. An assembly adapted for mounting instrument chassis and the like comprising: a housing comprising a base and a pair of opposed, vertical, parallel, side panels spaced apart on and secured to said base defining an open front for access to the space between said panels, a pair of vertical, floating, co-planar, support members individual to each panel, parallel thereto, disposed within said each panel and spaced therefrom, the members defining corresponding access, a plurality of resilient devices secured between each said panel and the ones of the pair of members individual thereto providing the sole support for said members for isolating the same against transmission of shock and vibration from said panel to said pair of members, said side panels, members and devices constituting permanent portions of the housing, a plurality of instrument chassis adapted to be removably installed between and supported commonly on said members, and means common to each said chassis and members for detachably and rigidly securing each said chassis individually with respect thereto.

5. An assembly in accordance with claim 4 wherein each said chassis includes a horizontally disposed base including an attaching portion, and the detachably securing means individual thereto comprises a pair of struts each extending transversely between a pair of laterally opposite support members and elements passing through said attaching portion for fastening said chassis to said struts.

6. An assembly adapted for mounting instrument chassis and the like comprising: a housing comprising a base and a pair of opposed, vertical, parallel, side panels spaced apart on and secured to said base defining an open front for access to the space between said panels, each panel having at least the vertical, forward margin thereof returned perpendicularly to the body of the panel to provide a pair of coplanar, forwardly-facing, vertically-directed, elongated, flat, marginal sections, a floating support member individual to each panel, partially coextensive therewith depthwise and substantially completely coextensive therewith heightwise, each support member being positioned inside its panel, parallel thereto and spaced therefrom, the members defining corresponding access, at least two resilient devices secured between said member and its associated panel providing the sole support for said member for isolating the same against transmission of shock and vibration from the panel to the member, said side panels, members and devices constituting permanent portions of the housing, a strut extending between said members having a substantially channel-shaped transverse cross section secured by its ends to said members, the web of the channel being vertical and flush with the said marginal panel sections, an instrument chassis adapted to be supported on said strut, and means common to said chassis and strut for detachably securing said chassis thereto.

7. An assembly adapted for mounting a plurality of instrument chassis and the like comprising: a housing comprising a pair of vertically extending, spaced-apart, side panels defining an open front for access therebetween, means for rigidly maintaining said panels in said relationship, said panels and means constituting essentially an outer wall structure of said housing, and an inner wall structure comprising a pair of vertically-extending members, one adjacent to each of said side panels and positioned therewithin to define corresponding access, resilient means interposed between each said side panel and the member individual thereto to support the inner wall structure floatingly within said outer wall structure, a plurality of instrument chassis adapted to be received between said members, and means for detachably securing said chassis to said members.

References Cited in the file of this patent

UNITED STATES PATENTS

| | | |
|---|---|---|
| 1,903,812 | Gebhard | Apr. 18, 1933 |
| 2,488,372 | Breisch | Nov. 15, 1949 |
| 2,577,101 | Ball | Dec. 4, 1951 |
| 2,735,964 | Grieve | Feb. 21, 1956 |
| 2,867,377 | Lasko | Jan. 6, 1959 |
| 2,880,379 | Stoddart | Mar. 31, 1959 |

FOREIGN PATENTS

| | | |
|---|---|---|
| 457,723 | Great Britain | Dec. 4, 1936 |
| 463,322 | Canada | Feb. 21, 1950 |